(12) United States Patent
Fletzer

(10) Patent No.: US 9,662,726 B2
(45) Date of Patent: May 30, 2017

(54) DEVICE FOR DEBURRING BUTT-WELDED RAIL JOINTS

(71) Applicant: PLASSER & THEURER EXPORT VON BAHNBAUMASCHINEN GESELLSCHAFT M.B.H., Vienna (AT)

(72) Inventor: Robert Fletzer, Voesendorf (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 0 days.

(21) Appl. No.: 14/901,899

(22) PCT Filed: Jul. 7, 2014

(86) PCT No.: PCT/EP2014/001854
§ 371 (c)(1),
(2) Date: Dec. 29, 2015

(87) PCT Pub. No.: WO2015/014433
PCT Pub. Date: Feb. 5, 2015

(65) Prior Publication Data
US 2016/0199925 A1    Jul. 14, 2016

(30) Foreign Application Priority Data
Aug. 2, 2013 (AT) ................. GM253/2013

(51) Int. Cl.
*E01B 31/15* (2006.01)
*B23D 79/02* (2006.01)
(Continued)

(52) U.S. Cl.
CPC .......... *B23D 79/026* (2013.01); *B23D 1/006* (2013.01); *B23K 11/046* (2013.01); *E01B 31/12* (2013.01);
(Continued)

(58) Field of Classification Search
CPC ....... B23D 79/026; B23D 13/02; E01B 31/12; E01B 31/15; Y10T 409/50164;
(Continued)

(56) References Cited

U.S. PATENT DOCUMENTS 3,978,746 A    9/1976 Kuchuk-Yatsenko et al.
4,175,897 A *  11/1979 Kuchuk-Yatsenko ... B23D 79/026
                                                    409/300
(Continued)

FOREIGN PATENT DOCUMENTS

AT     352503 B  *  9/1979   ........... B23K 11/046
EP     0038242 A1    10/1981
(Continued)

*Primary Examiner* — Erica E Cadugan
(74) *Attorney, Agent, or Firm* — Laurence A. Greenberg; Werner H. Stemer; Ralph E. Locher

(57) ABSTRACT

A welding unit for welding rails of a track includes a shearing device for removing a weld bead. The shearing device includes a head part having a shearing edge and two side parts which are pivotable towards one another and have a shearing edge. A rail base section to be applied to a rail base is associated with each side part. The rail base sections each include an end region facing towards each another having a tooth system for a form-locking connection which is effective in a longitudinal direction of the rail after the two side parts have been applied to the rail.

1 Claim, 2 Drawing Sheets

(51) Int. Cl.
  *B23D 1/08* (2006.01)
  *B23K 11/04* (2006.01)
  *B23K 101/26* (2006.01)
  *B23D 1/00* (2006.01)
  *E01B 31/12* (2006.01)

(52) U.S. Cl.
  CPC .......... *E01B 31/15* (2013.01); *B23K 2201/26* (2013.01); *Y10T 29/5182* (2015.01); *Y10T 409/50164* (2015.01); *Y10T 409/501312* (2015.01); *Y10T 409/508364* (2015.01)

(58) Field of Classification Search
  CPC ...... Y10T 409/501312; Y10T 29/5182; B23K 11/04; B23K 11/043; B23K 11/046; B23K 2201/26
  USPC ......... 219/53, 78.15; 409/298, 296; 29/33 A
  See application file for complete search history.

(56) References Cited

U.S. PATENT DOCUMENTS

| | | | |
|---|---|---|---|
| 4,410,780 | A | 10/1983 | Mutti |
| 8,735,761 | B2 | 5/2014 | Theurer et al. |
| 9,168,608 | B2 * | 10/2015 | Vaia ................... B23K 11/046 |

FOREIGN PATENT DOCUMENTS

| | | | |
|---|---|---|---|
| EP | 0132227 B1 | 12/1986 | |
| EP | 2315877 A1 | 5/2011 | |
| GB | 2185703 A | 7/1987 | |
| WO | WO-2010/119461 A1 * | 10/2010 | ........... B23K 11/046 |

* cited by examiner

DEVICE FOR DEBURRING BUTT-WELDED RAIL JOINTS

BACKGROUND OF THE INVENTION

Field of the Invention

The invention relates to a welding unit for welding rails of a track, including a shearing device provided for removing a weld bead, the shearing device being composed of a head part having a shearing edge and two side parts which are pivotable towards one another and each have a shearing edge, wherein associated with each side part is a rail base section provided for being applied to a rail base.

Welding units of this type for so-called mobile flash-butt welding have already become known in various embodiments from a multitude of publications, such as, for example, EP 2 315 877 or GB 2 185 703 A.

A further welding unit is known from EP 0 132 227 B1, in which the two unit bodies are connected to one another by a toggle lever. The displacement cylinders are fastened to a transverse beam on which are provided clamping drives for gripping the rail.

A shearing device for removing a weld bead is described in more detail in U.S. Pat. No. 3,978,746.

BRIEF SUMMARY OF THE INVENTION

It is the object of the present invention to provide a welding unit of the type mentioned at the beginning which enables improved operation.

According to the invention, this object is achieved with a welding unit of the specified kind in that, in an end region facing towards each another, the two rail base sections have a tooth system for a form-locking connection which is effective in a longitudinal direction of the rail after the two side parts have been applied to the rail.

As a result of this special configuration of the rail base sections, it is now possible in an advantageous manner to carry out the welding of two rails also above a sleeper.

Additional advantages of the invention become apparent from the drawing description.

BRIEF DESCRIPTION OF THE SEVERAL VIEWS OF THE DRAWING

The invention will be described in more detail below with reference to an embodiment represented in the drawing in which.

DESCRIPTION OF THE INVENTION

Figure 1:
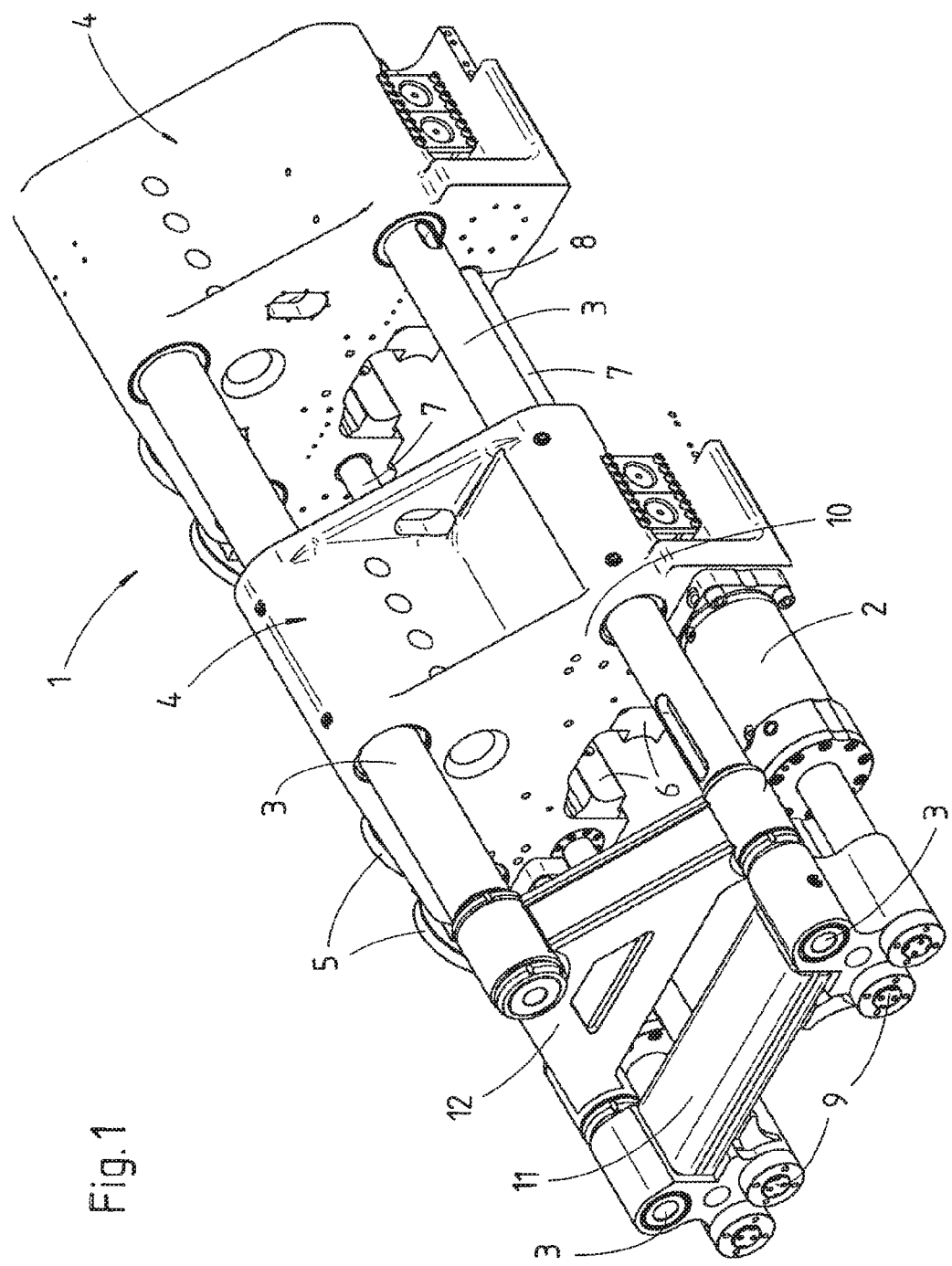
FIG. 1 shows a perspective view of a welding unit.

A welding unit 1 shown in FIG. 1 is composed of two assembly units 4 which are displaceable towards one another with the aid of displacement cylinders 2 along assembly guides 3. Said assembly units 4 are each connected to two clamping drives 5 by means of which clamping jaws 6 are pressed against rails to be welded to one another, not shown in detail. The total of three assembly guides 3 are connected to one another by a bridge 12.

Draw bars 7 extending parallel to the assembly guides 3 have a first end 8 fastened to the first assembly unit 4 and are guided through the second assembly unit 4, wherein a second end 9 is protruding in each case with regard to an exterior surface 10, extending perpendicularly to the assembly guides 3, of the second assembly unit 4.

The second ends 9 of the two draw bars 7 are connected to a transverse beam 11. Each displacement cylinder 2 is fastened, on the one hand, to said exterior surface 10 of the second assembly unit 4 and, on the other hand, to the transverse beam 11. The latter is mounted for displacement along the two lower assembly guides 3 which, for that purpose, are configured to be longer than the upper assembly guide 3.

Figure 2:
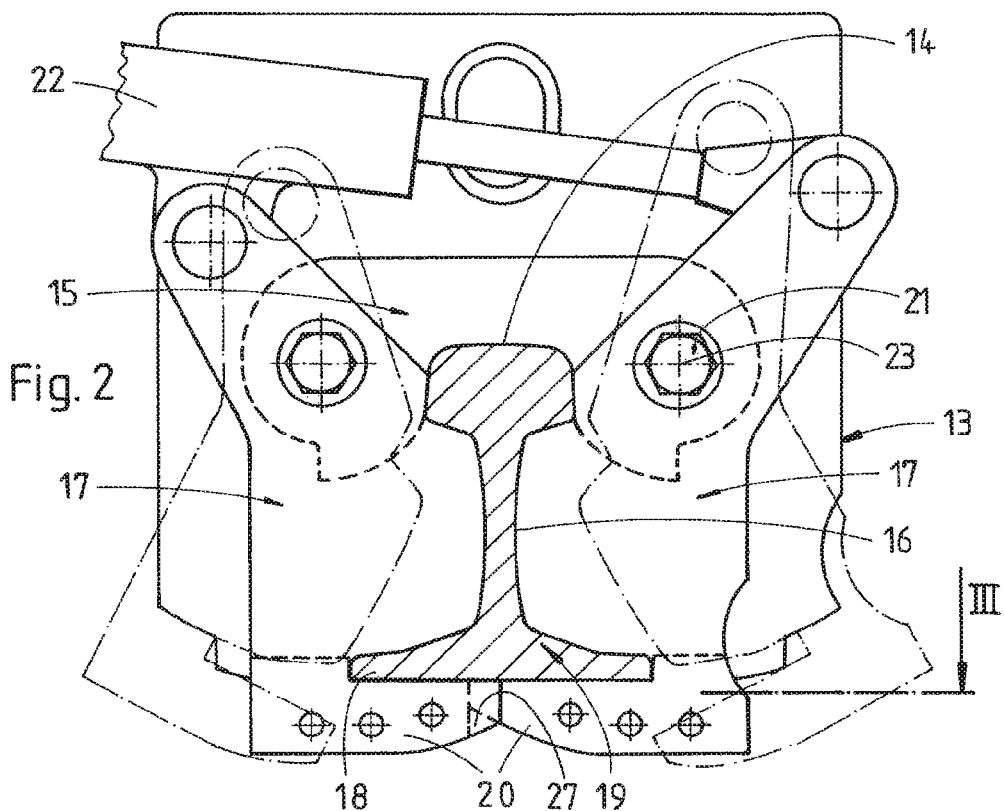
FIG. 2 shows a view, in the longitudinal direction of the rail, of a shearing device.

A shearing device 13, positioned between the two assembly units 4 and not shown in FIG. 1 for better clarity, for shearing off a weld bead is visible in FIG. 2.

The shearing device 13 is composed of a head part 15, having a shearing edge 14, and two side parts 17 which are pivotable towards one another and each have a shearing edge 16. A rail base section 20 provided for being applied to a rail base 18 of a rail 19 is associated with each side part 17. The two side parts 17 are each mounted to the head part 15 by means of a quickly releasable plug connection 21. Additionally, each side part 17 is connected to a pivot drive 22 for pivoting about an axis 23 extending parallel to the rail 19.

Figure 3:
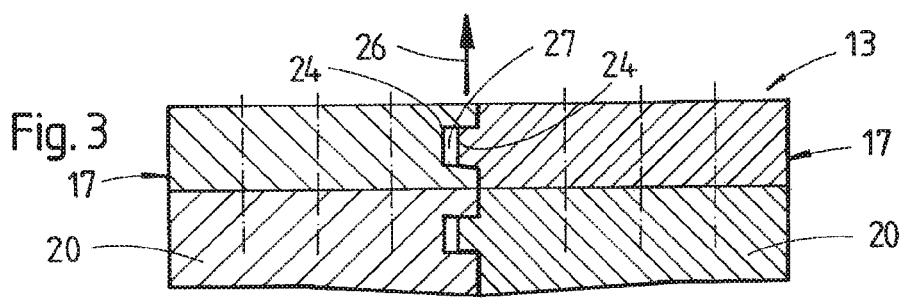
FIG. 3 shows an enlarged section through the shearing device according to section line III in FIG. 2.

In an end region 24 facing towards each another, the two rail base sections 20 have a tooth system 27 for a form-locking connection which is effective in a longitudinal direction 25 of the rail or of a shearing direction 26 after the two side parts 17 have been applied to the rail 19 (see particularly FIG. 3). With this, it is possible to design the two rail base sections 20 to have a lesser height, so that a welding operation can also be carried out directly above a sleeper.

Figure 4:
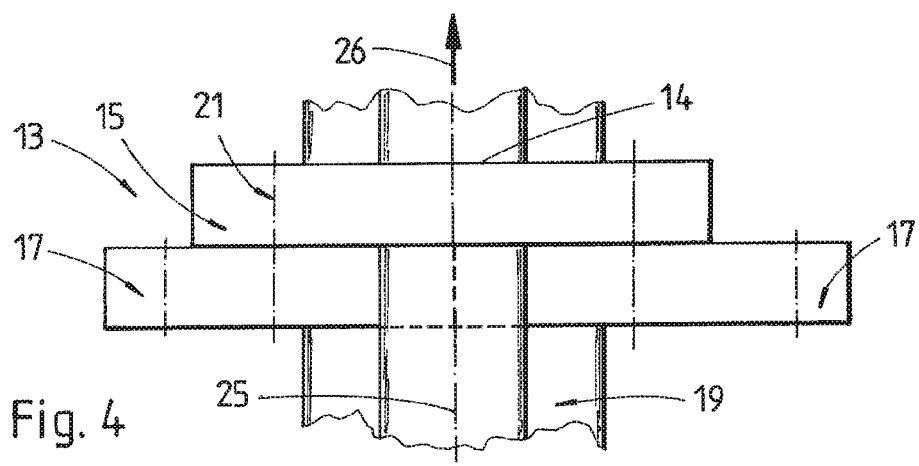
FIG. 4 shows a top view of the shearing device.

As can be seen in FIG. 4, the head part 15 is positioned in front of the two side parts 17 with regard to the shearing direction 26. Owing to that, the weld bead is automatically broken open during shearing off from the rail 19 and can thus be removed in a simpler manner.

The invention claimed is:

1. A welding unit for welding rails of a track, the welding unit comprising:
    a shearing device for removing a weld bead, said shearing device including a head part having a shearing edge, and said shearing device including two side parts being pivotable towards one another about a respective pivot axis, the pivot axes extending parallel to a longitudinal direction of the rails, each of said side parts having a shearing edge;
    rail base sections to be applied to a rail base of one of the rails, each of said rail base sections being associated with a respective one of said side parts and each of said rail base sections having an end region facing towards each another; and
    each of said end regions having a tooth system providing an intermeshed form-locking connection when said two side parts have been applied to the rail.

* * * * *